United States Patent [19]

Watanabe

[11] 4,265,142
[45] May 5, 1981

[54] MANUAL AND POWER MOTIVATED DRIVE MEANS

[75] Inventor: Yutaka Watanabe, Hon, Japan

[73] Assignee: Minolta Camera Kabushiki Kaisha, Osaka, Japan

[21] Appl. No.: 901,050

[22] Filed: Apr. 28, 1978

[30] Foreign Application Priority Data

May 10, 1977 [JP] Japan .................. 52/59911

[51] Int. Cl.³ .................. F16H 1/06; G03B 23/12; F16H 3/34
[52] U.S. Cl. .................. 74/625; 40/471; 74/354; 74/626; 74/802; 74/810; 74/414; 242/67.4; 353/26 R
[58] Field of Search .................. 74/414, 625, 626, 802, 74/810, 353, 354; 40/518, 471, 361; 242/67.4, 67.3 R, 179; 353/26 A, 26 R

[56] References Cited

U.S. PATENT DOCUMENTS

| 24,101 | 5/1859 | Colton | 74/802 |
|---|---|---|---|
| Re. 26,616 | 6/1969 | Tomaro, Jr. | 74/810 |
| 876,141 | 1/1908 | Boyer | 40/518 |
| 2,094,669 | 10/1937 | Pratt | 74/353 |
| 2,130,111 | 9/1938 | Whitney et al. | 74/802 X |
| 2,231,784 | 2/1941 | Von Thungen | 74/802 |
| 2,470,317 | 5/1949 | Murphy | 74/626 X |
| 2,506,562 | 5/1950 | Wait | 74/354 |
| 2,621,542 | 12/1952 | Rath | 74/626 |
| 2,724,289 | 11/1955 | Wight | 74/625 |
| 2,753,030 | 7/1956 | Wight | 74/625 X |
| 2,753,736 | 7/1956 | Mitchell | 74/625 |
| 2,896,873 | 7/1959 | Mageoch | 74/354 X |
| 3,073,561 | 1/1963 | Jermyn | 74/414 X |
| 3,154,965 | 11/1964 | Fennessy | 74/625 X |
| 3,156,136 | 11/1964 | Sogabe | 74/802 |
| 3,184,177 | 5/1965 | Hannah | 242/55.12 |
| 3,229,540 | 1/1966 | Baranowski, Jr. | 74/354 |
| 3,290,987 | 12/1966 | James et al. | 88/24 |
| 3,391,583 | 7/1968 | Sheesley | 74/626 |
| 3,501,980 | 3/1970 | Arick | 74/802 X |
| 3,564,935 | 2/1971 | Vigneri | 74/354 |
| 3,678,282 | 7/1972 | Johnson et al. | 250/219 FR |
| 3,686,974 | 8/1972 | Little, Jr. | 74/354 |
| 4,033,684 | 7/1977 | Toriumi et al. | 353/27 A |
| 4,065,983 | 1/1978 | Mimura | 74/625 |

FOREIGN PATENT DOCUMENTS

| 80977 | 7/1920 | Austria | 74/306 |
|---|---|---|---|
| 1402285 | 1/1969 | Fed. Rep. of Germany | 74/414 |
| 18339 | of 1892 | United Kingdom | 74/414 |

Primary Examiner—Leslie Braun
Attorney, Agent, or Firm—Wolder, Gross & Yavner

[57] ABSTRACT

A manual and power motivated drive apparatus, wherein a web is advanced by a drive means, such as a motor comprises; a driven means mounted on an output shaft coupled to the drive means; a manually rotatable input shaft; a first motion transmission means mounted on the input shaft; and a second intermediate motion transmission means engaging the first transmission means and rockable about the input shaft upon the rotation of the first transmission means. The second transmission means is rocked about the input shaft upon rotation thereof in a manner to be brought into engagement with the driven means, whereby the driving force of the input shaft is transmitted by way of the first and second transmission means and the driven means to the output shaft.

10 Claims, 5 Drawing Figures

MANUAL AND POWER MOTIVATED DRIVE MEANS

BACKGROUND OF THE INVENTION

This present invention relates generally to improvements in rotational adjusting mechanisms, and particularly to an improved manual drive mechanism in a device equipped with a powered or automatic drive means, such as an electric motor.

Where it is desired to manually shift or advance a web which is shifted or advanced by an automatic or powered drive means, such as a motor, it has been customary to deactuate or stop the drive means, then disconnect the web being advanced from the drive means, and connect the web to a manual drive means, so that an operator may mannually shift or advance the web a desired distance.

To this end, it has been necessary to separately provide the manual drive means and the automatic drive means and to position the advanceable web connectably in a manner engageable with both the manual and automatic drive means.

Furthermore, the drive means requires the use of a means for transmitting the drive force thereof to the web being advanced, and a means for interrupting the transmission of such drive force thereto. In addition, a means for changing over between the automatic drive and the manual drive operations must be provided for the drive means. Thus, a great complexity in the construction of the drive apparatus per se, as well as a great difficulty in the handling thereof result.

In the event of an improper switching operation between the manual drive and the powered or automatic drive operations, the drive force of the powered drive means, such as an electric motor, would be transmitted by way of the manual drive means to an operator's hands, entailing a danger of injury or inconvenience to the operator.

Such a drive mechanism or device is employed in various mechanisms or machines, such as an automatic positioning or detecting mechanism for a microfilm handling machine, a moving picture compiling machine for a 8-mm film, an automatic machine tool, and so forth. Typical of these machines is a manually film-driving device for manually correcting the position of the projected image or a selected frame of a microfilm, for use in a microfilm automatic probing machine, wherein a microfilm is shifted by a powered drive means, such as a motor, so as to locate a selected frame properly at a projecting position.

In such a device, when it is desired to project an image of a selected frame of a microfilm in roll form onto a screen, a procedure must be followed in which the microfilm in roll form is advanced or shifted by energizing a motor; a mark on the desired frame of the film is optically detected; and immediately before the desired frame arrives at the projecting position, the motor is stopped, so as to locate the desired frame properly in the projecting position, so that an image of the desired frame is projected onto a screen. However, the projection magnification ratio of a microfilm is commonly as large as 20 times, and even only a small positional deviation of the selected frame from the projecting position is greatly enlarged on a screen. For this reason, accuracy in the control of the frame position is necessary. However, it is difficult to accurately start and stop the drive mechanism, such as a motor, as well as the mechanism for braking the drive mechanism, because of the inertia of the rotor and other factors, even if a pulse motor or a potentiometer is used. Thus, the overrunning of the selected frame from the proper projecting position results, leading to the excessive shifting of the projected image from the proper position on the screen, or in the extreme case the projected image completely passing the screen.

The correction of the positional deviation of an image projected on a screen has hitherto been accomplished by manually intermittently operating a drive means, such as a motor, or a decoupling or disengaging means, such as a clutch. However, because the operation of such means is instantaneous, it necessitates repeated corrections by a skilled operator to locate the desired frame in a proper position.

Where the correction of the position of a selected frame of a microfilm is made without utilizing such drive means, a microfilm must be shifted by a separate shifting means, after the film has been disengaged from such drive means. For this purpose there must be provided a mechanism for interrupting the connection between the drive means and the film and a manual film-drive means for the driving apparatus, resulting in a high complexity in the construction of the drive apparatus. Furthermore, a switching operation between the automatic drive mode and the manual drive mode is required, incurring the danger of injuring the operator due to an inadvertent transmission of the drive force from the automatic or powered drive means to the manual drive means, in the event of an improper switching operation.

SUMMARY OF THE INVENTION

It is a principal object of the present invention to provide an improved automatic drive apparatus.

It is another object of the present invention to provide an improved automatic drive apparatus having a manual drive means.

It is a further object of the present invention to provide an improved automatic drive apparatus with a manual drive means, which is simple in construction and capable of changing over between an automatic drive mode and a manual drive mode.

It is a still further object of the present invention to provide an improved automatic drive apparatus with a manual drive means, wherein the manual drive operation is achieved with ease and safety.

It is a still further object of the present invention to provide an improved automatic drive apparatus with a manual drive means, which is applicable to known or conventional automatic drive devices without a need to change or modify the latter.

To attain these and other objects of the present invention, there is provided according to the present invention an automatic drive apparatus for advancing a web by a power drive means, such as a motor, which comprises; a drive force receiving or driver means mounted on an output drive shaft associated with the aforesaid drive means; a manually rotatable input shaft; a first motion transmission means mounted on the input shaft; and an intermediate second transmission means engaging the first transmission means, and swingable about the input shaft with the rotation of the first transmission means; the intermediate second transmission means being swung about the input shaft in a manner to be brought into engagement with the drive force receiving means, whereby the drive force of the input shaft is transmitted by way of the first and second transmission means and the drive force receiving means to the output shaft. The manual drive means of the present invention may be applied to an existing automatic driving apparatus. A high simplicity in the constuction of the manual drive means is achieved. The manual drive is accomplished with ease merely by manually rotating the input shaft.

For a fuller understanding of the nature and objects of the present invention, reference should be had to the following detailed description taken in conjunction with the accompanying drawings.

BRIEF DESCRIPTION OF THE DRAWINS

DESCRIPTION OF PREFERRED EMBODIMENT

Figure 1:
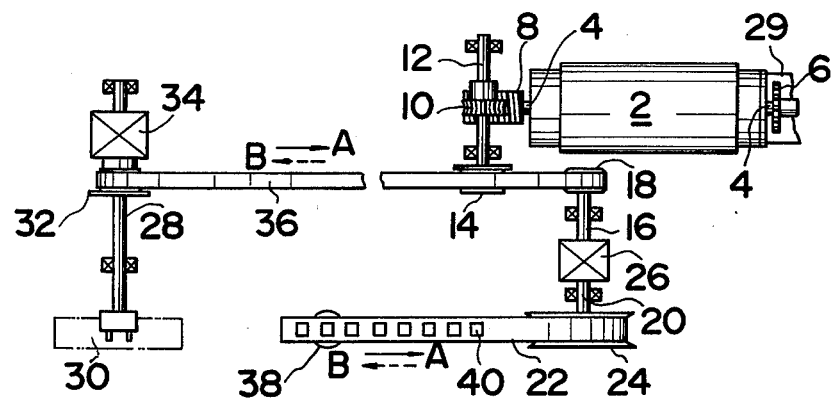
FIG. 1 is a fragmentary plan view of a device for advancing a microfilm and incorporating a mechanism according the present invention.

Referring now to the drawings which illustrate a preferred embodiment of the present invention a motor 2 has a motor shaft 4 extending therethrough, on one end of which is mounted a driven gear 6, and on the other end of which is mounted a worm 8, which in turn is in mesh with a worm wheel 10. Worm wheel 10 and a drive pulley 14 are mounted on a drive shaft 12, which is rotatably supported. A rotatably-supported, take-up shaft 16 supports a driven pulley 18. A reel shaft 20 functions to wind a film 22 in roll form on a reel 24 and is connected by way of an electromagnetic clutch 26 to take-up shaft 16. A reel shaft 28 for a take-up reel 30 is journaled in bearings and connected through an electromagnetic clutch 34 to a driven pulley 32. A timing belt 36 is trained around drive pulley 14, and driven pulleys 18 and 32. A projecting lens 38 for projecting the image of a frame 40 of film 22 onto a screen is located along the path of film 22.

There is provided a known detecting means (not shown), such as disclosed in U.S. Pat. No. 3,184,177, for detecting the moving film 22 and stopping the motor 2 so as to properly locate a desired frame 40 of the film 22 at a projecting position of a projecting lens 38.

In operation, when motor 2 is energized and take-up shaft 16 is drive coupled to reel shaft 20 due to the engagement of a electromagnetic clutch 26 and driven pulley 32 is uncoupled from reel shaft 28 due to the disengagement of electromagnetic clutch 34, then a drive force of motor 2 is transmitted from motor shaft 4 to reel shaft 20 successively by way of worm 8, worm wheel 10, drive shaft 12, drive pulley 14, timing belt 36, driven pulley 18 and take-up shaft 16, whereby film 22 is taken up on reel 24. At this time, timing belt 36 and film 22 are shifted in the direction of arrow A in FIG. 1. Moreover, since the film 22 is unwound from reel 30, the drive force of motor 2 need not be supplied to the reel and electromagnetic clutch 34 is therefore maintained disengaged so as to release reel 30 from the drive system.

When it is desired to feed the film 22 back to reel 30, motor 2 is run in a reverse direction and the engagement between driven pulley 32 and reel shaft 28 is effected by means of electromagnetic clutch 34, and the engagement of take-up shaft 16 with reel shaft 20 is released by means of electro-magnetic clutch 26. Film 22 is thus taken up on reel 30 in the manner described above.

As the film 22 is advanced to be taken up on one of the reels, the detection of a desired frame is effected by a known means, for example, by detecting a blip mark or indicia (not shown) provided on each frame of film 22, and the desired frame 40 thus detected is stopped at the projecting position of projecting lens 38. The prior art devices, however, have failed to provide the desired accuracy in the stopping operation, as earlier explained. The present invention is accordingly directed to achieving the accurate stopping operation by using the mechanism illustrated in detail in FIGS. 2 through 5. Driven gear 6 is mounted on the output or motor shaft 4 of motor 2 and a manually operable input shaft 42 is rotatably mounted in a support frame 44 for motor 2 coaxially with output or motor shaft 4 and in alignment therewith. A manually operable gear 46 is mounted on manually operable shaft 42 on the end thereof toward motor shaft 4, and a lever or support member 48 is independently rockably or rotatably coaxially mounted on manually operable shaft 42. Lever member 48 rotatably supports respective pairs of coaxially fixed planetary gears 50 and 52 on the opposite ends thereof, one gear of each pair being in mesh with gear 46. Planetary gears 50 and 52 are frictionally loaded by the action of compression springs 54 entrapped between lever member 48 and the respective confronting gears, and are adapted to revolve on their axes through at an initial relative rate determined by the braking force due to the frictional resistance and in a direction of in accordance with that of gear 46, along with lever member 48, when revolved by means of manually operable gear 46.

Figure 2:
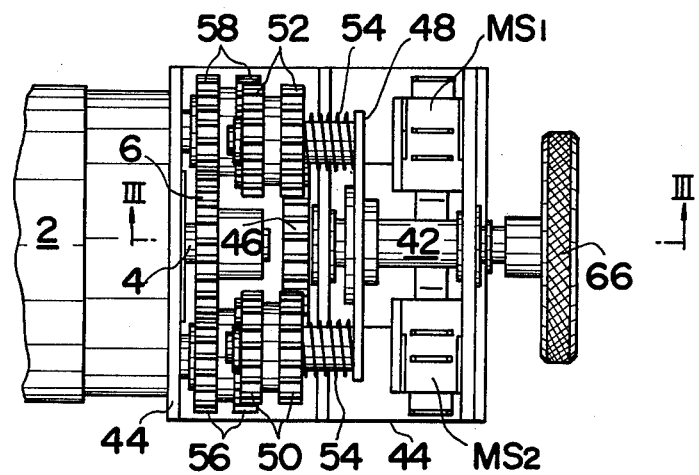
FIG. 2 is a plan view of the essential part of one embodiment of the present invention.
Figure 3:
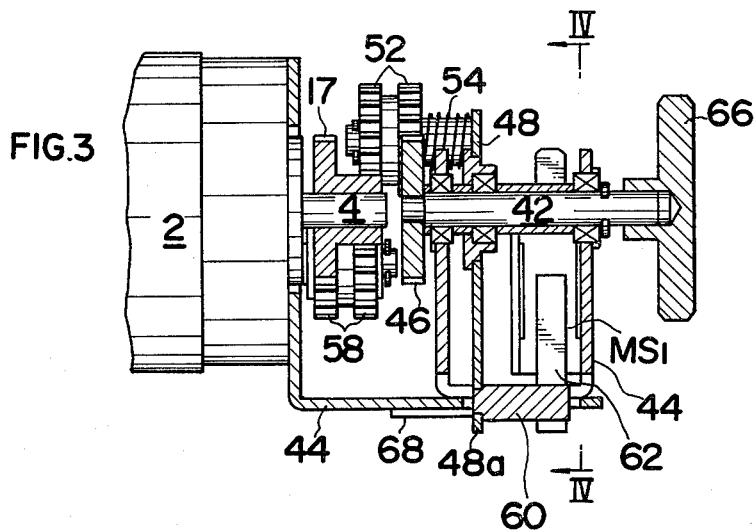
FIG. 3 is a cross-sectional view taken along the line III—III of FIG. 2.

Two transversely spaced pairs of intermediate coaxially fixed gears 56 and 58 are journaled to support frame 44 in mesh with driven gear 6 and individually below planetary gears 50 and 52 in respective opposing relation thereto. Each of the opposing planetary gear 50 and intermediate gear 56 or 52 and 58 of each set thereof is so dimensioned and disposed that planetary gear 50 or 52, when rotated toward the intermediate gears, are alternatively brought into engagement with respective intermediate gear 56 or 58 opposing thereto. In FIGS. 2 and 3, planetary gears 50, 52 and intermediate gears 56, 58 are shown, in which such portions of the former as to be brought into mesh with those of the latter as well as such portions of the former as to be brought into mesh with manually operable gear 46, or driven gear 6 are spaced apart a predetermined distance from one another.

Lever member 48 has an actuating pin 60 on an arm 48a depending therefrom on a side opposite to the planetary gear support portion thereof. Pin 60 is positionally controlled by actuating levers 62 and 64 of a pair of microswitches MS1 and MS2. Since pin 60 is maintained biased through the mediary of levers 62 and 64 by the force of springs incorporated in microswitches MS1 and MS2, the lever member 48 is normally resiliently retained in a neutral position as shown by a solid line in FIG. 4, in which the respective planetary gears 50 and 52 are out of engagement and out of meshing relation with respective intermediate gears 56 and 58. A handle 66 is mounted on the outer end of manually operable input shaft 42. Shown at 68 and 70 are stops for adjusting the angle of swing or the inclination of lever member 48, which in turn adjusts the depth or extent of engagement between planetary gears 50, 52 and intermediate gears 56, 58, respectively.

Figure 5:
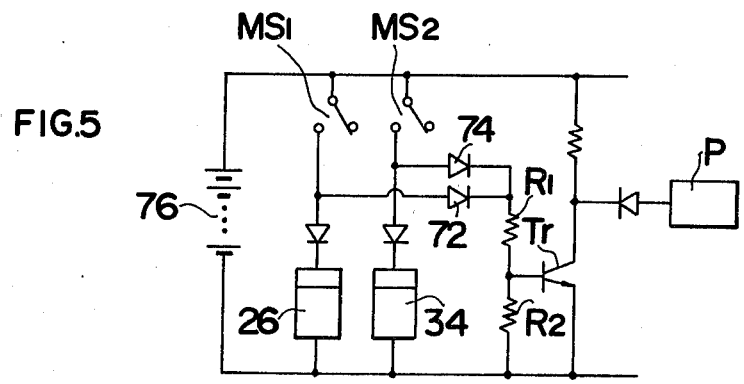
FIG. 5 is a diagram of an electric circuit incorporated in the embodiment of the present invention.

FIG. 5 shows part of an electric circuit incorporated in the device described above. Electromagnetic clutches 26 and 34 are each connected in series with respective diodes and microswitches MS1 and MS2 across a DC power source 76. Diodes 72 and 74 are connected on the positive sides thereof to the positive sides of electromagnetic clutches 26 and 34, respectively, and connected on the negative sides thereof to one terminal of a resistor R1, the other terminal of which is connected through a resistor R2 to the negative ground. The junction of resistors R1 and R2 is connected to the base of a transistor Tr whose emitter is grounded and collected connected to the positive by a resistor.

Reference mark P designates a known operating means for rendering motor 2 inoperative when the collector potential of transistor Tr is lowered and is coupled to the transistor collector.

Figure 4:
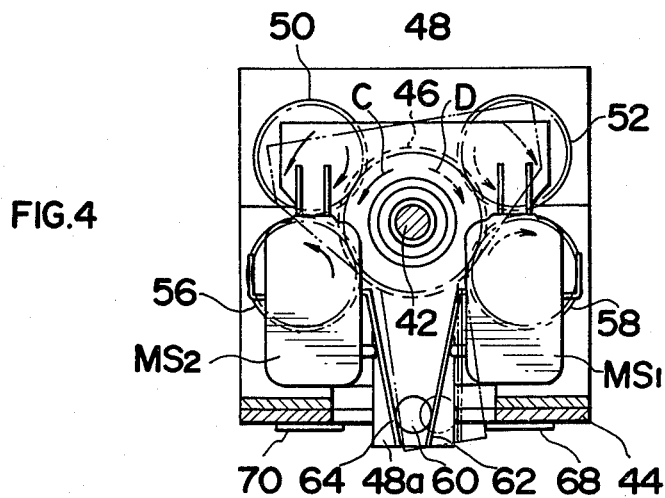
FIG. 4 is a cross-sectional view taken along the line IV—IV of FIG. 3.

In operation, when the handle 66 is turned to manually rotate input shaft 42 in the direction of arrow C in FIG. 4, then planetary gears 50 and 52 will revolve on their axes, and at the same time, be swung about the axis of the input and output shafts counterclockwise to positions shown by phantom lines in FIG. 4 along with lever member 48, whereby planetary gear 50, for use in the normal rotation, is brought into engagement with intermediate gear 56 for use in the normal rotation and continues to rotate on its axis. The rotation of manually operable shaft 42 is thus transmitted from planetary gear 50 by way of intermediate gear 56 to driven gear 6 mounted on motor shaft 4, thereby rotating motor shaft 4 in the normal direction, whereby film 22 is advanced in the normal direction as shown by the arrow A in FIG. 1 by way of the automatic driving means. If manually operable input shaft 42 is rotated in the direction of the arrow D, planetary gears 50 and 52 swing axes clockwise as viewed in FIG. 4, along with lever member 48, whereby planetary gear 52 for use in the reverse rotation is brought into engagement with intermediate gear 58 opposing thereto, thereby reversing the rotation of output motor shaft 4. Film 22 is thus advanced in the opposite direction, namely in the direction of an arrow B in FIG. 1.

In the manual driving operation, film 22 may be moved or advanced in the normal or reverse direction selectively, depending on the position of a projected image on the screen, so as to correct the position of the desired frame 40 of film 22 offset from the proper projecting position.

Lever member 48, in the driving operation in the normal direction, is pivotally moved counterclockwise to assume an inclined position as shown by a phantom line in FIG. 4, thereby biasing and pressure actuating lever 62 of microswitch MS1. Microswitch MS1 is thus closed, thereby completing and closing the energizing circuit of electromagnetic clutch 26, and hence electromagnetic clutch 26 alone is brought into engage condition. In the driving operation in the reverse direction, lever member 48 is pivotally moved clockwise as viewed in FIG. 4 to assume an inclined position biasing and pressure actuating the lever 64 of microswitch MS2, whereby microswitch MS2 is closed, thereby completing and closing the energizing circuit for electromagnetic clutch 34 in FIG. 5 to bring the clutch 34 alone into engage condition. Thus, in the manual driving operation, as well, a driving force is transmitted only to one of the reel shafts, 20 or 28, serving to take up a film thereon.

When one of electromagnetic clutches 26 or 34, is energized and brought into an engage condition depending on a driving operation in the normal or reverse direction, the base potential of transistor Tr in FIG. 5 in increased as a result of one of microswitches MS1 and MS2 being closed, to thereby allow a current to flow from the collector to the emitter. Under this condition, driving means P deenergizes motor 2 and renders it inoperative in response to the lowered collector potential at the collector of transistor T2. By virtue of the action of operating means P, despite the manual driving during the automatic detection, motor 2 remains stopped, so that no driving force acts on handle 66. After the termination of the manual driving operation, the manual driving means is biased by lever 62 or 64 to its home or neutral position.

With the mechanism of the present invention, a prior art automatic driving mechanism and stopping mechanism may be utilized without any change or modification, and the manual advance of a web may be easily and accurately achieved by only rotating the manually operable shaft. Furthermore, unless the manually operable shaft is rotated, the manual drive means is maintained disengaged from the automatic or powered drive mechanism, so that there is no risk of the handle being inadvertently rotated.

In the illustrated embodiment, intermediate gears 56 and 58 are interposed between planetary gears 50, 52 and driven gear 6, respectively. If the positional relationship between the manually operable shaft 42 and planetary gears 50 and 52 is modified, such interemediate gears 56 and 58 may be obviated and the direction of the manually operable, rotating shaft may coincide with that of the driven gear.

In the embodiment shown, gears are used for the transmission of the driving force of motor 2 or handle 66, but such gears may be replaced by any other suitable means.

Where the mechanism of the present invention is applied to an automatic projector in general use, manual film feeding is provided, and such automatic projector may be used as a film compiling machine, as well.

While there have been described and illustrated preferred embodiments of the present invention, it is apparent that numerous alterations, omissions and additions may be made without departing from the spirit thereof.

What is claimed is:

1. A manual and power motivated drive apparatus for manually driving an object, comprising:
   a power driven output shaft drive coupled to a motor;
   drive force receiving means mounted on said output shaft;
   a manually rotatable input shaft;
   first motion transmission means mounted on said input shaft;
   intermediate second transmission means in engagement with said first motion transmission means and swingable about said input shaft in response to the rotation of said first motion transmission means;
   biasing means urging said intermediate second transmission means about said input shaft, said second transmission means being spaced away from said drive force receiving means under the influence of said biasing means when said input shaft is stationary and drive engaging said drive force receiving means in response to said swinging of said second transmission means about said input shaft against the influence of said biasing means when said input shaft is rotated, whereby the driving force of said input shaft is transmitted to said output shaft; and deactuating means responsive to the swing of said second transmission means for deactuating said motor.

2. A drive apparatus as claimed in claim 1, wherein said intermediate second transmission means includes two intermediate transmission members which are alternatively connected to said drive force receiving means in response to the respective direction of said rotation of said input shaft.

3. A drive apparatus as claimed in claim 1, further including intermediate receiving means for rotating said drive force receiving means and said input shaft in opposite directions, said intermediate receiving means being rotatably mounted in engagement with said drive force receiving means and drive engaging said second transmission means when said second transmission means is swung.

4. A drive apparatus as claimed in claim 1 wherein said deactuating means includes switch members and said biasing means includes springs for said switch members.

5. A manual and power motivated drive apparatus for manually driving an object, comprising:
   a power driven output shaft;
   drive force receiving means mounted on said output shaft;
   two intermediate receiving members rotatably maintained in drive engagement with said drive force receiving means;
   a manually rotatable input shaft;
   drive force transmitting means mounted on said input shaft; and
   intermediate transmission means including two intermediate transmission members maintained in drive engagement with said drive force transmitting means and being swingable about said input shaft in response to the rotation of said drive force transmitting means, said intermediate transmission members being spaced away from said intermediate receiving members when said input shaft is stationary and alternatively respectively drive engaging respective intermediate receiving members in response to the direction of rotation of said intermediate transmission means about said input shaft when said input shaft is rotated whereby the drive force of said input shaft is transmitted to said output shaft to rotate said output shaft in a direction responsive to the direction of rotation of said input shaft.

6. A manual and power motivated drive apparatus for manually driving an object, comprising:
   a power driven output shaft;
   a drive force receiving member mounted on said output shaft;
   a pair of intermediate receiving members rotatably mounted in engagement with said drive force receiving means;
   a manually rotatable input shaft;
   a first motion transmission member mounted on said input shaft; and
   a pair of intermediate transmission members rotatably mounted in engagement with said first motion transmission means and swingable about said input shaft in response to the rotation of said first motion transmission means, said intermediate transmission members being spaced away from said intermediate receiving members when said input shaft is stationary and either of said intermediate transmissions members drive engaging either of said intermediate receiving members in response to said swinging of said intermediate transmission members about said input shaft when said input shaft is rotated, whereby the driving force of said input shaft is transmitted to said output shaft.

7. A manual and power motivated drive apparatus for manually driving an object, comprising:
   a motor having a power driven output shaft;
   drive force receiving means mounted on said output shaft;
   a manually rotatable input shaft;
   means for deactuating said motor in response to the rotation of said input shaft;
   first motion transmission means mounted on said input shaft; and
   intermediate second transmission means in engagement with said first motion transmission means and swingable about said input shaft in response to the rotation of said first motion transmission means, said second transmission means being spaced away from said drive force receiving means when said input shaft is stationary and drive engaging said drive force receiving means in response to said swinging of said second transmission means about said input shaft when said input shaft is rotated, whereby the driving force of said input shaft is transmitted to said output shaft.

8. A manual and power motivated drive mechanism comprising a power driven output shaft, a manually driven input shaft, a first rotational drive coupling member mounted on said output shaft, a second rotational drive coupling member mounted on said input shaft, a pair of third rotational drive coupling members drive coupled to said second coupling member, a support rockably mounted on said input shaft and supporting said third coupling members, and a pair of fourth coupling members peripherally engaging said first coupling member, either of said third coupling members alternatively out of engagement with or in engagement with a respective fourth coupling member in response to the angular position of said support on said input shaft.

9. The drive mechanism as claimed in claim 8 wherein said support is positioned to said angular position while said input shaft is rotated.

10. A manual and power motivated drive mechanism comprising motor means having a power driven output shaft a manually driven input shaft, a first rotational drive coupling member mounted on said output shaft, a second rotational drive coupling member mounted on said input shaft, transmission means including a pair of third rotational drive coupling members drive coupled to said second coupling member and alternatively movable into drive coupling with said first coupling member in response to the rotation thereof, and deactuating means for deactuating said motor in response to the transfer of said transmission means to drive engagement with said first coupling member whereby the direction of rotation of said output shaft is responsive to the direction of rotation of said input shaft.

* * * * *